(12) United States Patent
Smeets et al.

(10) Patent No.: US 10,862,690 B2
(45) Date of Patent: Dec. 8, 2020

(54) TECHNIQUE FOR HANDLING DATA IN A DATA NETWORK

(71) Applicant: Telefonaktiebolaget LM Ericsson (publ), Stockholm (SE)

(72) Inventors: Bernard Smeets, Dalby (SE); Mats Näslund, Bromma (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 159 days.

(21) Appl. No.: 15/515,073

(22) PCT Filed: Sep. 30, 2014

(86) PCT No.: PCT/EP2014/070942
§ 371 (c)(1),
(2) Date: Mar. 28, 2017

(87) PCT Pub. No.: WO2016/050285
PCT Pub. Date: Apr. 7, 2016

(65) Prior Publication Data
US 2017/0244567 A1   Aug. 24, 2017

(51) Int. Cl.
*H04L 9/32* (2006.01)
*H04L 29/06* (2006.01)
(Continued)

(52) U.S. Cl.
CPC ............ *H04L 9/3247* (2013.01); *H04L 9/006* (2013.01); *H04L 9/0643* (2013.01);
(Continued)

(58) Field of Classification Search
CPC ............ H04L 2209/805; H04L 63/123; H04L 63/126; H04L 63/1466; H04L 9/006;
(Continued)

(56) References Cited

U.S. PATENT DOCUMENTS 6,055,508 A * 4/2000 Naor .................. G06Q 10/0639
705/7.38
6,097,811 A    8/2000 Micali
(Continued)

FOREIGN PATENT DOCUMENTS

EP      1912376 A1    4/2008
JP   2007028015 A    2/2007
(Continued)

OTHER PUBLICATIONS

PCT International Search Report, dated Jun. 25, 2015, in connection with International Application No. PCT/EP2014/070942, all pages.
(Continued)

*Primary Examiner* — Gary S Gracia
(74) *Attorney, Agent, or Firm* — Leffler Intellectual Property Law, PLLC

(57) ABSTRACT

A technique for handling data provided from a source node to a collecting node in a data network is described. As to a method aspect of the technique, the source node generates a sequence of values. The sequence is unrevealed in the data network by the source node in a time interval. An authentication of the sequence is triggered in the data network. The authentication associates the sequence with the source node. One or more signatures for one or more data sets to be sent in the time interval are computed using one or more values of the sequence. The one or more data sets in the time interval are sent from the source node to the collecting node. The source node further provides one or more of the signatures.

31 Claims, 11 Drawing Sheets

(51) Int. Cl.
*H04L 9/00* (2006.01)
*H04L 9/06* (2006.01)
*H04L 9/08* (2006.01)
*H04L 9/14* (2006.01)
*H04L 9/30* (2006.01)

(52) U.S. Cl.
CPC .............. *H04L 9/0894* (2013.01); *H04L 9/14* (2013.01); *H04L 9/30* (2013.01); *H04L 9/3268* (2013.01); *H04L 63/123* (2013.01); *H04L 63/126* (2013.01); *H04L 63/1466* (2013.01); *H04L 2209/805* (2013.01)

(58) Field of Classification Search
CPC ....... H04L 9/0643; H04L 9/0894; H04L 9/14; H04L 9/30; H04L 9/3247; H04L 9/3268
USPC ......... 455/411; 380/247; 713/176, 181, 189; 726/3
See application file for complete search history.

(56) References Cited

U.S. PATENT DOCUMENTS

| | | | |
|---|---|---|---|
| 6,397,329 | B1 | 5/2002 | Aiello et al. |
| 7,068,254 | B2 | 6/2006 | Yamazaki et al. |
| 7,340,610 | B1 | 3/2008 | Yagawa |
| 8,086,842 | B2 | 12/2011 | Sidhu et al. |
| 8,510,566 | B1* | 8/2013 | Oprea .................. H04L 9/3297 713/181 |
| 9,614,682 | B2 | 4/2017 | Buldas et al. |
| 9,698,993 | B2 | 7/2017 | Zaverucha et al. |
| 2002/0184504 | A1 | 12/2002 | Hughes |
| 2002/0194484 | A1 | 12/2002 | Bolosky et al. |
| 2003/0078058 | A1 | 4/2003 | Vatanen et al. |
| 2004/0049675 | A1 | 3/2004 | Micali et al. |
| 2006/0149671 | A1* | 7/2006 | Nix .......................... G06Q 20/14 705/40 |
| 2007/0214363 | A1 | 9/2007 | Ishii |
| 2008/0095360 | A1 | 4/2008 | Vuillaume et al. |
| 2008/0211624 | A1 | 9/2008 | Micali et al. |
| 2009/0070361 | A1* | 3/2009 | Haber ................. G06F 21/6254 |
| 2009/0164783 | A1 | 6/2009 | Solis et al. |
| 2009/0199010 | A1 | 8/2009 | Hakuta et al. |
| 2009/0235349 | A1 | 9/2009 | Lai et al. |
| 2010/0110935 | A1* | 5/2010 | Tamassia ............ H04L 67/1065 370/256 |
| 2010/0268943 | A1 | 10/2010 | Roy-Chowdhury et al. |
| 2010/0290617 | A1* | 11/2010 | Nath ...................... H04L 9/008 380/29 |
| 2012/0046110 | A1 | 2/2012 | Amaitis et al. |
| 2012/0239935 | A1 | 9/2012 | Osborne et al. |
| 2012/0322413 | A1* | 12/2012 | Haddad .................. H04L 63/08 455/411 |
| 2012/0324229 | A1 | 12/2012 | Buldas et al. |
| 2013/0083926 | A1* | 4/2013 | Hughes ..................... H04L 9/08 380/278 |
| 2013/0163412 | A1 | 6/2013 | Hughes et al. |
| 2013/0326224 | A1* | 12/2013 | Yavuz .................. H04L 9/3247 713/176 |
| 2014/0108817 | A1 | 4/2014 | Chen et al. |
| 2014/0198791 | A1 | 7/2014 | Lim |
| 2014/0245020 | A1* | 8/2014 | Buldas .................. H04L 9/3257 713/177 |
| 2015/0052615 | A1 | 2/2015 | Gault et al. |
| 2015/0189005 | A1* | 7/2015 | Dubois ................... H04L 63/10 709/217 |
| 2015/0222619 | A1 | 8/2015 | Hughes et al. |
| 2015/0295720 | A1* | 10/2015 | Buldas ................. H04L 9/3263 713/176 |
| 2016/0028552 | A1 | 1/2016 | Spanos et al. |
| 2018/0013567 | A1 | 1/2018 | Davis |
| 2018/0205552 | A1 | 7/2018 | Struttmann et al. |

FOREIGN PATENT DOCUMENTS

| | | |
|---|---|---|
| JP | 2011205234 A | 10/2011 |
| TW | 201123802 A | 7/2011 |
| WO | 0011828 A1 | 3/2000 |
| WO | 0106701 A1 | 1/2001 |
| WO | 011843 A1 | 2/2001 |
| WO | 2006004794 A2 | 1/2006 |
| WO | 2006124894 A2 | 11/2006 |
| WO | 2007087363 A2 | 8/2007 |
| WO | 2008014002 A2 | 1/2008 |
| WO | 2011099904 A1 | 8/2011 |
| WO | 2014074041 A1 | 5/2014 |
| WO | 2014127904 A1 | 8/2014 |
| WO | 2015155368 A1 | 10/2015 |

OTHER PUBLICATIONS

PCT Written Opinion, dated Jun. 25, 2015, in connection with International Application No. PCT/EP2014/070942, all pages.
Jing Deng et al., Secure Code Distribution in Dynamically Programmable Wireless Sensor Networks, Information Processing in Sensor Networks, 2006, The Fifth International Conference Nashville, TN, USA, Apr. 19-21, 2006, pp. 292-300.
Yuzhe Tang et al., Outsourcing Multi-Version Key-Value Stores with Verifiable Data Freshness, 2014 IEEE 30th International Conference on Data Engineering, Mar. 31, 2014, pp. 1214-1217.
Chang Liu et al., Public Auditing for Big Data Storage in Cloud Computing—A Survey, 2013 IEEE 16th International Conference on Computational Science and Engineering, Dec. 3, 2013, pp. 1128-1135.
Don Coppersmith et al., Almost Optimal Hash Sequence Traversal, pp. 1-16.
Ahto Buldas et al., Efficient Implementation of Keyless Signatures with Hash Sequence Authentication, pp. 1-13.
Ahto Buldas et al., Efficient Quantum-Immune Keyless Signatures with Identity, p. 1-14.
Ahto Buldas et al., Keyless Signatures' Infrastructure: How to Build Global Distributed Hash-Trees, pp. 1-9.
Ahto Buldas et al., Knowledge-Binding Commitments with Applications in Time-Stamping (Full Version), pp. 1-17.
Merkle Tree, from Wikipedia, the free encyclopedia, 3 pages.
Ahto Buldas et al., Security Proofs for the BLT Signature Scheme, pp. 1-22.
Quan Son Nguyen, Multi-Dimensional Hash Chains and Application to Micropayment Schemes, arXiv:cs/0503060v1 [cs.CR] Mar. 23, 2005, pp. 1-9.
Erik Dahmen et al., Short Hash-Based Signatures for Wireless Sensor Networks, Cryptology and Network Security, Springer Berlin Heidelberg, Dec. 12, 2009, pp. 463-476.
Josh Benaloh et al., One-Way Accumulators: A Decentralized Alternative to Digital Signatures, Advances in Cryptology Eurocrypt 93, Springer Berlin Heidelberg, May 23, 1993, pp. 274-285.
Ahto Buldas et al., Optimally Efficient Accountable Time-Stamping, Public Key Cryptography; Lecture Notes in Computer Science; Springer-Verlag, Berlin/Heidelberg, Mar. 23, 2004, pp. 293-305.
Ahto Buldas et al., Keyless Signatures' Infrastructure: How to Build Global Distributed Hash-Trees, Correct System Design, Lecture Notes in Computer Science, Springer International Publishing, Cham, pp. 313-320.
PCT International Search Report dated Apr. 8, 2016 in connection with International Application No. PCT/EP2016/050297, all pages.
Written Opinion dated Apr. 8, 2016 in connection with International Application No. PCT/EP2016/050297, all pages.
PCT International Search Report dated Apr. 11, 2016 in connection with International Application No. PCT/EP2016/050860, all pages.
Written Opinion dated Apr. 11, 2016 in connection with International Application No. PCT/EP2016/050860, all pages.
Nobutaka Kawaguchi et al., Efficient log authentication for Forensic Computing, Proceedings of the 2005 IEEE, Workshop on Information Assurance and Security, United States Military Academy, West Point, NY, pp. 215-223.

(56) References Cited

OTHER PUBLICATIONS

Duc-Phong Le et al., Signtiming Scheme based on Aggregate Signatures, ISI 2008, Jun. 17-20, 2008, Taipei, Taiwan, pp. 145-149.
Wei Guo et al., Study on the Security of Time-Stamping Service Architecture, 2009 International Conference on Electronic Commerce and Business Intelligence, pp. 28-32.
PCT International Search Report dated Apr. 11, 2016 in connection with International Application No. PCT/EP2016/050861, all pages.
Written Opinion dated Apr. 11, 2016 in connection with International Application No. PCT/EP2016/050861, all pages.
Ahto Buldas et al., Security Proofs for Hash Tree Time-Stamping Using Hash Functions with small Output Size, ACISP 2013, LNCS 7959, pp. 235-250.
PCT International Search Report dated Apr. 13, 2016 in connection with International Application No. PCT/EP2016/050858, all pages.
Written Opinion dated Apr. 13, 2016 in connection with International Application No. PCT/EP2016/050858, all pages.
Non-Final Office Action dated Jun. 25, 2018 in connection with U.S. Appl. No. 15/312,651, 50 pages.
Ahto Buldas et al., Keyless Signatures' Infrstructure: How to Build Global Distributed Hash-Trees, 2013, Springer, Berlin, Heidelberg, pp. 1-9.
Non-Final Office Action dated Aug. 7, 2018 in connection with U.S. Appl. No. 15/312,624, 38 pages.
"Message authentication code", https://web.archive.org/web/20111224220942/http://en.wikipedia.org:80/wiki/Message_Authentication_Code, Dec. 24, 2011, Wikipedia, 7 pages (Year 2011).
Non-Final Office Action dated Jun. 29, 2018 in connection with U.S. Appl. No. 15/312,661, 59 pages.
"Message authentication code", https://web.archive.org/web/20120620150708/https://en.wikipedia.org/wiki/Message_authentication_code, Jun. 6, 2018, Wikipedia, pp. 1-2 (Year:2012).
PCT International Search Report, dated Apr. 8, 2016, in connection with International Application No. PCT/EP2016/050857, all pages.
PCT Written Opinion, dated Apr. 8, 2016, in connection with International Application No. PCT/EP2016/050857, all pages.
Yih-Chun Hu et al., Efficient Constructions for One-Way Hash Chains, In: Correct System Design, Jan. 1, 2005, Springer International Publishing, vol. 3531, pp. 423-441.
H. Krawczyk et al, Feb. 1997, HMAC: Keyed-Hashing for Message Authentication; Network Working Group; Request for Comments: 2104; Category: Informational; 10 pages.
Danny De Cock, Belgian eID Card Technicalities, Jun. 21, 2005, 34 pages.
PCT International Search Report, dated Dec. 16, 2015, in connection with International Application No. PCT/EP2015/057900, all pages.
PCT Written Opinion, dated Dec. 16, 2015, in connection with International Application No. PCT/EP2015/057900, all pages.
Markus Jakobsson et al., Fractal Merkle Tree Representation and Traversal, Grid and cooperative computing-GCC 2004, third international conference, Wuhan, China, Oct. 21-24, 2004, pp. 314-326.
Non-Final Office Action dated Mar. 24, 2017 in connection with U.S. Appl. No. 14/443,779, 23 pages.
Non-Final Office Action dated Sep. 7, 2018 in connection with U.S. Appl. No. 15/310,756, 67 pages.
Notice of Allowance dated Jan. 9, 2019 in connection with U.S. Appl. No. 15/310,756, 10 pages.
Non-Final Office Action dated Aug. 16, 2018 in connection with U.S. Appl. No. 16/030,207, 22 pages.
Notice of Allowance dated Apr. 16, 2019 in connection with co-pending U.S. Appl. No. 16/030,207, 17 pages.
European Communication dated Oct. 17, 2019 in connection with European Application No. 14777603.3, 6 pages.

* cited by examiner

700

- Receive, from a collecting node, a root value of a Merkle tree that is associated with a time interval and computed based on a plurality of signatures provided by the at least one source node for a plurality of data sets sent in the time interval to the collecting node ⸺702

- Receive, from at least one of the source nodes or the collecting node, at least one of the data sets ⸺704

- Request the at least one source node to at least partially reveal after expiry of the time interval a sequence of values used for computing at least one signature for the received at least one of the data sets ⸺706

- Verify an authentication of the sequence in the data network, wherein the authentication associates the sequence with the source node ⸺708

- Compute at least one reference signature for the received at least one data set using at least one of the values of the sequence ⸺710

- Compute a reference root value based on the at least one reference signature for auditing the data provision ⸺712

Fig. 7

TECHNIQUE FOR HANDLING DATA IN A DATA NETWORK

TECHNICAL FIELD

The present disclosure relates to a technique for handling data in a data network. More specifically, and without limitation, a technique for an auditable exchange of data in a distributed data network is provided.

BACKGROUND

"Big data" and the Internet of Things (IoT) are examples for the rapidly expanding area of distributed data networks and acquisition of distributed data. Data generated at a plurality of source nodes are collected for processing and/or analysis. An example for the source nodes includes sensor networks that perform measurements and provide measurement data, e.g., in home automation data networks or industrial processing data networks. A further example includes servers in a data center generating event log records, e.g. for operational security.

The operation of data networks, such as above examples, relies upon the integrity of the data received from the distributed data sources. This means that as data is collected, it has to be possible to verify that the data has not been tampered with since the data left the source node. Furthermore, the data source has to be authentic. This means that an indicated source, e.g., a source node indicated by the received data or a data packet including the data, is the actual originator of the data.

Depending on operational security requirements, it is not sufficient that only the intended recipient collecting the data can verify aspects of integrity and authenticity. Rather, it is required that third parties can audit the data exchange between the source nodes and the collecting node. Conventional techniques for authenticating the data source implement public-key cryptography, e.g., using a Public Key Infrastructure (PKI) with signatures on all data exchanged between the nodes.

However, generating signatures is resource consuming in minimalistic source nodes (also referred to as "low-end devices") such as sensors. Furthermore, the impact of signatures on bandwidth and/or storage is disproportionally large compared to the data to be exchanged. E.g., since the nodes have to be prepared for an audit, a large number of signatures have to be stored for relatively long time periods in the nodes. Moreover, signatures verifiable by a PKI are known to be cumbersome to establish and maintain over time, especially if many sources of data have to be distinguished, i.e., identified by means of different certificates.

Other conventional techniques, e.g. GuardTime KSI™ products, implement Merkle trees. Aggregating hash values of the exchanged data in a Merkle tree is efficient, since the "root" of the Merkle tree provides a compressed digest of all individual hash values, so that the Merkle tree reduces storage requirements. However, since no pairs of secret key and private key are involved as opposed to the PKI, the Merkle tree fails to provide source authentication, neither to the collecting node nor to a 3rd party auditor.

SUMMARY

Accordingly, there is a need for a technique that allows verifying that data provided by a node in a data network is untampered.

According to one aspect, a method of handling data provided from a source node to a collecting node in a data network is provided. The method comprising the following steps performed by the source node: a step of generating a sequence of values, wherein the sequence is unrevealed in the data network by the source node in a time interval; a step of triggering an authentication of the sequence in the data network, wherein the authentication associates the sequence with the source node; a step of computing one or more signatures for one or more data sets to be sent in the time interval using one or more values of the sequence; a step of sending, from the source node to the collecting node, the one or more data sets in the time interval; and a step of providing one or more of the signatures.

By providing the signature of one or more data sets, the collecting node or any auditor can verify that the data set is untampered in at least some implementations. Same or other implementations can verify that the data originates from the authentic data source by virtue of the authentication.

The authentication may further associate the sequence with the time interval. The source node may use the values of the sequence for computing signatures only in the time interval and/or only for data sets that are sent, or are to be sent, in the time interval.

The source node may provide one or more signatures for all data sets sent in the time interval. E.g., the source node may provide one signature for each of the data sets sent in the time interval. Data sets, for which no signature is provided, may be rejected and/or marked as unreliable by the collecting node and/or the auditor. Alternatively or in addition, a data set, for which the provided signature is computed using a sequence that is not associated with the time interval in which the data set has been sent, may be rejected and/or marked as unreliable by the collecting node and/or the auditor.

The source node may, at least partially, reveal the sequence after expiry of the time interval. The sequence may be, at least partially, revealed upon request. The sequence may be revealed to the collecting node in the data network and/or the auditor. The revealing may include sending at least one of the one or more values of the sequence, the entire sequence of values and a generator of the sequence. The request may specify one or more of the data sets. The values used for computing the signatures of the specified data sets may be revealed. The data sets may be specified by means of at least one of a point in time when the data set was sent or recorded, the time interval in which the data set was sent and a serial number of the data set.

The auditor may be any third party relative to the data communication between the source node and the collecting node. The auditor does not have to be a node of the data network. The auditor may be a node temporally connected to the data network, e.g., specifically for or exclusively during the audit.

A clock of the source node may define the time interval. The time interval may also be referred to as an audit interval or authentication interval. The time interval may be locally defined, e.g., at the source node. The time interval may begin as the sequence is generated. The clock of the source node does not have to be synchronous with a clock at the requesting node, e.g., without requiring synchronized clocks at the source node and the collecting node. The time of the clock at the source node may be decisive for whether or not the time interval has expired. The source node may refuse the request for revealing the sequence, if the clock of the source node indicates that the time interval has not expired. Alternatively or in addition, the source node may delay the revealing until the clock of the source node indicates that the time interval has expired. The source node may refuse revealing the sequence, e.g., if the collecting node or the auditor requests the sequence prior to expiry of the time interval, e.g., due to lacking synchronization.

The one or more data sets may be stored at the source node at least until after the time interval has expired. The stored data sets may be sent, e.g., upon request, to the auditor. The one or more signatures may be provided from the source node to the collecting node and/or the auditor.

The signature, s(k), may be computed for each of the one or more data sets, m(k), to be sent according to $$s(k)=H(R(k), m(k)),$$

wherein H may be a hash function and R(k) may be any one of the values of the sequence. The hash function may be a cryptographic (e.g., one-way) hash function, e.g. implemented using an SHA-256 hash function, SHA-3 hash function, or a Whirlpool hash function.

The hash function may be a function of both the value and the data set (e.g., including any function of the data set). The value and the data set may be input to the hash function by concatenating the value and the data set, e.g., by means of bitwise concatenation.

The authentication may be triggered before at least one of sending the one or more data sets, providing the one or more signatures, and revealing the sequence. The authentication of the sequence may be triggered by providing an authenticator of the sequence. The authentication may bind a hash value of the sequence to an identifier of the source node.

The authentication may bind the hash value through a message authentication code computed using a key associated with the identifier of the source node. The key may be shared with a trusted third party, e.g., a network operator. The key associated with an identifier of the source node may be stored in the data network only at the source node and the trusted third party. The authenticator may include a hash value computed based on both the hash value of the sequence and a key of the source node.

The authenticator may be computed in a key storage token. The key storage token may include storage that holds the key associated with the identifier of the source node. The key storage token may be a Subscriber Identity Module (SIM) or a Universal SIM (USIM). The identifier of the Source Node may include a Mobile Subscriber Identification Number (MSIN) and/or an International Mobile Subscriber Identity (IMSI).

The authentication of the sequence may be triggered by registering the hash value of the sequence at an authenticating node providing access to the authenticator in the data network. Registering may include sending the hash value of the sequence to the authenticating node via a secure channel that secures that the hash value of the sequence is sent from the source node.

The authentication node may issue, optionally upon request, a certificate, e.g., to any node in the data network. The certificate may include the hash value of the sequence and an identifier of the source node. A signature of the authentication node may be attached to the certificate. The signature of the authentication node may be computed based on a private key of the authenticating node and the certificate, e.g., according to an RSA function. A public key of the authentication node associated with the private key of the authentication node may be accessible to or stored at the requesting node in the data network for verifying the authenticity of the certificate.

The data network may be a distributed data network. The network may include a plurality of source nodes. Each of the plurality of source nodes may provide data to the collecting node according to the method. Each of the values in the sequence may also be referred to as an authentication key of the source node. The registration may include signing of the hash value of the sequence using a key associated with the identifier of the source node.

Alternatively or in addition, the authentication may bind the hash value through a digital signature. The digital signature may be computed using a secret key related to a public key, e.g., as a pair of keys. The public key may be associated with the identifier of the source node.

The sequence of values may be generated to include pseudo random numbers. The hash value of the sequence for the authentication may be based on all values in the sequence, e.g., all values used (or available to the source node for usage) in computing the signatures.

Alternatively or in addition, the sequence of values may be generated by iteratively applying a hash function, H, to a generator, R(N), according to $$R(k-1)=H(R(k)) \text{ for } k=N, \ldots, 1.$$

The hash function may be a cryptographic hash function. The hash function for computing the sequence values may be also used for computing the signatures. An end result, R(0), of the sequence generation may be the hash value of the sequence for the authentication.

The hash value of the sequence that is used for the authentication of the sequence may be unused for the computing of the signatures. E.g., the hash value, R(0), of the sequence may be unused for computing the signatures.

Each value in the sequence may be used at most once for computing any one of the signatures. The values of the sequence may be sequentially used for computing the signature of each of the data sets using each value of the sequence for at most one data set.

Time may be divided into a plurality of time intervals. The method may be performed for each of the time intervals. E.g., the sequence of numbers may be generated for each time interval.

According to another aspect, a method of handling data provided from a source node to a collecting node in a data network is provided. The method comprises the following steps performed by the collecting node: a step of receiving, from the source node, one or more data sets and one or more signatures for the one or more data sets that are sent in a time interval; a step of selectively requesting the source node to at least partially reveal after expiry of the time interval a sequence of values used for computing the signatures of the one or more data sets sent in the time interval; a step of verifying an authentication of the sequence in the data network, wherein the authentication associates the sequence with the source node; and a step of computing reference signatures for the one or more data sets using one or more values of the sequence for verifying integrity of the one or more received data sets.

The integrity of any one of the received data sets may be verified by comparing the reference signature computed based on the corresponding data set with the corresponding received signature.

Verifying the association between the hash value and the source node may also be referred to as verifying the authenticity of the hash value or the authenticity of the sequence. Verifying the association may include receiving an authenticator of the sequence, e.g., of the hash value of the sequence. The authenticator may be embodied by a message.

The authenticator may include a signature of the association between the sequence and the source node. The signature of the association may be computed and/or provided by an authenticating node, e.g., using a key of the authenticating node. The authenticator may also be referred to as a certificate. Alternatively or in addition, the signature of the association may be computed by the source node, e.g., using its Universal Subscriber Identity Module.

The method may further comprise computing a Merkle tree. Leaves of the Merkle tree may represent the received signatures. The Merkle tree may be computed, if data integrity is verified. The Merkle tree may be a data structure representing a labeled binary tree. Vertices of the Merkle tree that are connected to one other vertex may be referred to as leaves. The vertex of the Merkle tree that is connected to two other vertices may be referred to as root. Vertices of the Merkle tree that are connected to three other vertices may be referred to as internal vertices. The labels of the leaves of the Merkle tree may represent the received signatures. The label of any internal vertex, v, of the Merkle tree may be defined recursively from the labels of the two "children", i.e., Label(v)=H(Label(left(v))||Label(right(v))), wherein left(v) and right(v) correspond to the left and right children of the vertex v, respectively, and "||" denotes concatenation. The tree may be associated with and/or identified by the label of the root.

Data sets and signatures for the data sets may be received from one or more source nodes in the data network. The collecting node may receive data sets and corresponding signatures from different source nodes and/or different signatures from one or more source nodes. Each of the signatures received from each of the one or more source nodes may be input to a different one of the leaves of the Merkle tree.

The method may further comprise sending, to at least one of the source nodes, sibling values along a path in the Merkle tree between root and at least one leaf corresponding to the at least one of the source nodes. The source node may store the received sibling values. The source node may provide the stored sibling values, e.g. upon request, to an auditor.

The method may further comprise storing at the collecting node a value of the root of the Merkle tree. Alternatively or in addition, values of internal vertices and/or leaves of the Merkle tree may be stored at the collecting node. Values of internal vertices and/or values of leaves of the Merkle tree may be discarded, e.g., after the audit or if data integrity is verified. Data integrity may be verified for any received data set, if the signature computed based on the corresponding data set is equal to the corresponding received signature.

According to a further aspect, a method of auditing data provided from at least one source node to a collecting node in a data network is provided. The method comprises: a step of receiving, from the collecting node, a root value of a Merkle tree that is associated with a time interval and computed based on a plurality of signatures provided by the at least one source node for a plurality of data sets sent in the time interval to the collecting node; a step of receiving, from at least one of the source nodes or the collecting node, at least one of the data sets; a step of requesting the at least one source node to at least partially reveal after expiry of the time interval a sequence of values used for computing at least one signature for the received at least one of the data sets; a step of verifying an authentication of the sequence in the data network, wherein the authentication associates the sequence with the source node; a step of computing at least one reference signature for the received at least one data set using at least one of the values of the sequence; and a step of computing a reference root value based on the at least one reference signature for auditing the data provision.

The method may further comprise receiving, from the at least one source node or the collecting node, sibling values along a path in the Merkle tree between root and at least one leaf corresponding to the at least one reference signature for the received at least one data set. The computation of the reference root value may further be based on the received sibling values.

The method may further comprise receiving signatures, for which no reference signature is computed, from the at least one source node or the collecting node. The computation of the reference root value may further be based on the received signatures.

According to a still further aspect, a computer program product comprising instructions for performing the method of any method aspect is provided. The computer program product may perform the method when executed by one or more computing devices. The instructions may be provided on a computer-readable recording medium or for download in a network, e.g., the data network and/or the Internet.

Any one of the method aspects may further include features or steps, e.g., complementary steps, of any one of the other method aspects.

As to one hardware aspect, a device for handling data provided from a source node to a collecting node in a data network is provided. The device comprises a generating unit adapted to generate a sequence of values, wherein the sequence is unrevealed in the data network by the device in a time interval; an authenticating unit adapted to trigger an authentication of the sequence in the data network, wherein the authentication associates the sequence with the source node; a computing unit adapted to compute one or more signatures for one or more data sets to be sent in the time interval using one or more values of the sequence; and a sending unit adapted to send, from the source node to the collecting node, the one or more data sets in the time interval, and to provide one or more of the signatures.

As to another hardware aspect, a device for handling data provided from a source node to a collecting node in a data network is provided. The device comprises a receiving unit adapted to receive, from the source node, one or more data sets and one or more signatures for the one or more data sets that are sent in a time interval; a requesting unit adapted to selectively request the source node to at least partially reveal after expiry of the time interval a sequence of values used for computing the signatures of the one or more data sets sent in the time interval; a verifying unit adapted to verify an authentication of the sequence in the data network, wherein the authentication associates the sequence with the source node; and a computing unit adapted to compute reference signatures for the one or more data sets using one or more values of the sequence for verifying integrity of the one or more received data sets.

As to a still further hardware aspect, a device for auditing data provided from at least one source node to a collecting node in a data network is provided. The device comprises a receiving unit adapted to receive, from the collecting node, a root value of a Merkle tree that is associated with a time interval and computed based on a plurality of signatures provided by the at least one source node for a plurality of data sets sent in the time interval to the collecting node, and to receive, from at least one of the source nodes or the collecting node, at least one of the data sets; a requesting unit adapted to request the at least one source node to at least partially reveal after expiry of the time interval a sequence of values used for computing at least one signature for the received at least one of the data sets; a verifying unit adapted to verify an authentication of the sequence in the data network, wherein the authentication associates the sequence with the source node; and a computing unit adapted to compute at least one reference signature for the received at least one data set using at least one of the values of the sequence, and to compute a reference root value based on the at least one reference signature for auditing the data provision.

Any one of the hardware aspects may further comprise features described in the context of the method aspects. E.g., the units, or further units, may be adapted to perform any one of the steps of the method aspects.

BRIEF DESCRIPTION OF THE DRAWINGS

In the following, the present disclosure is described in more detail with reference to exemplary embodiments illustrated in the drawings, wherein:

FIG. 7 shows a flowchart of a method of auditing data provided from at least one source node to a collecting node in a data network that is implemented by the device of FIG. 4;

DETAILED DESCRIPTION

In the following description, for purposes of explanation and not limitation, specific details are set forth, such as specific device environments and specific network topologies in order to provide a thorough understanding of the technique disclosed herein. It will be apparent to one skilled in the art that the technique may be practiced in other embodiments that depart from these specific details. For example, the following embodiments may be implemented in a data network that communicates, at least partially, according to a Long Term Evolution (LTE). It will readily be apparent that the technique described herein may also be implemented in other mobile and stationary communication networks, including GSM networks, UMTS networks and LTE-Advanced networks.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
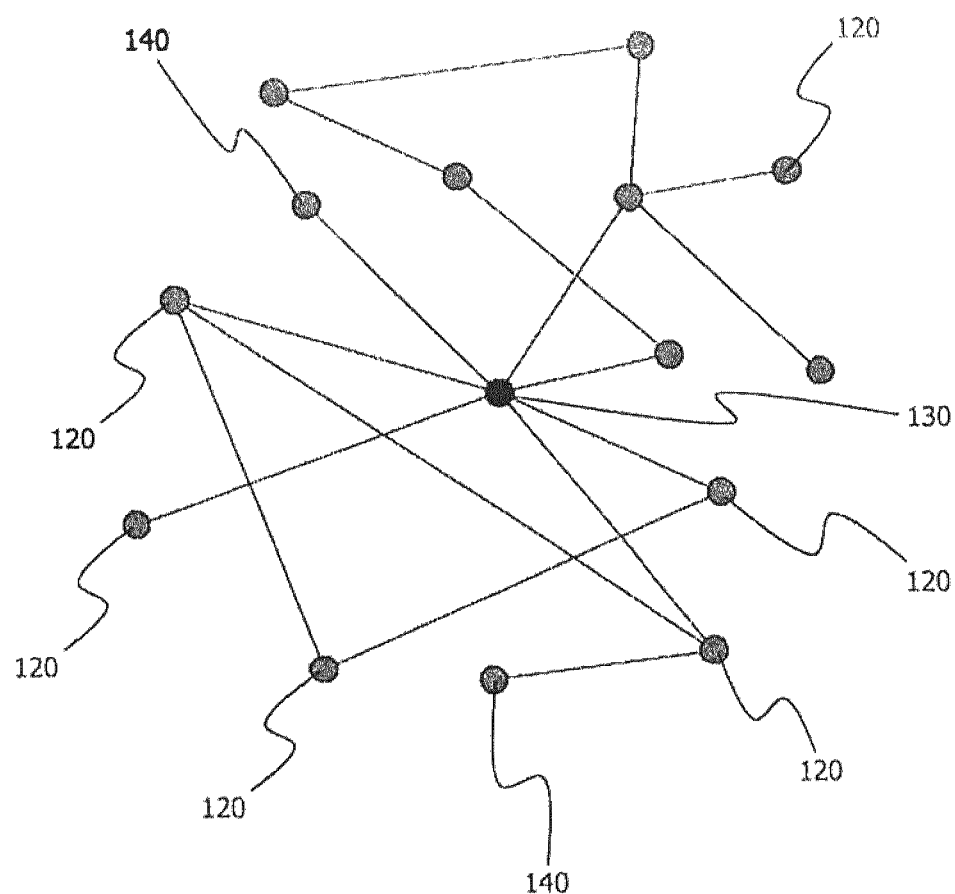
FIG. 1 schematically illustrates a data network including at least one source node, at least one collecting node and at least one auditor.

FIG. 1 schematically illustrates a data network 100 as an exemplary environment for implementing the technique. The data network 100 may be implemented, at least in parts, as a wireless network, e.g., a cellular telecommunications network and/or a wireless local area network. The data network 100 includes a plurality of nodes 120 to 140. At least some of the nodes may be mobile. Alternatively or in addition, at least some of the nodes may be stationary. Source nodes 120 provide data sets, e.g. periodically, event driven or upon request, to a collecting node 130. One or more auditors 140 at least temporally access the data network 100 or at least some of the nodes 120 and 130.

Figure 2:
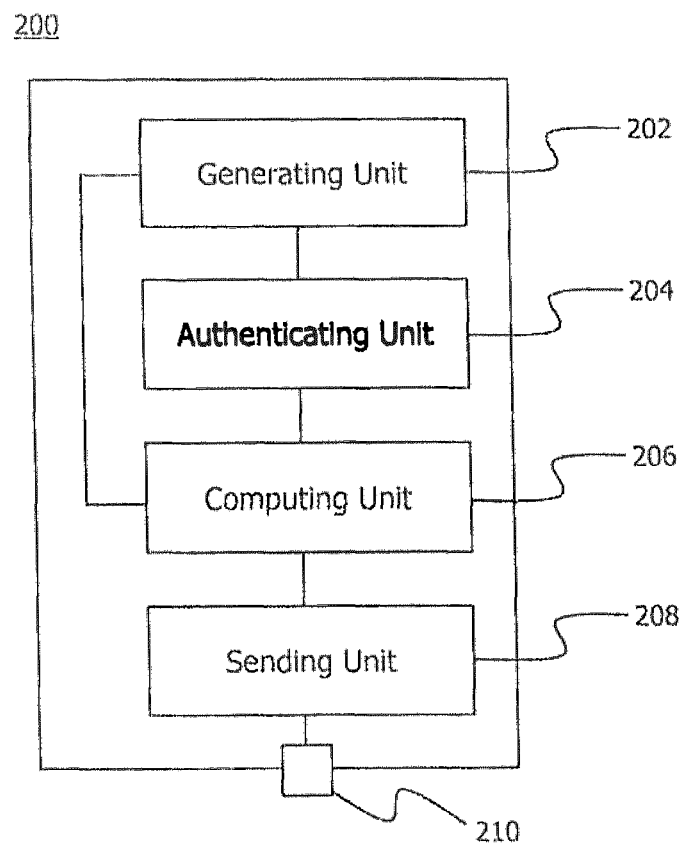
FIG. 2 shows a schematic block diagram of an embodiment of a device for handling data provided from a source node to a collecting node in a data network, which is implementable at the source node of FIG. 1.

FIG. 2 shows a schematic block diagram of a device 200 for handling the data provided by the source node 120. The device 200 may be implemented at some or all of the source nodes 120 in the data network 100.

The device 200 includes a generating unit 202 for generating a sequence of values used by an authenticating unit 204 and a computing unit 206. The computing unit 206 computes signatures for the data sets to be sent. A sending unit 208 sends the data sets, e.g., to the collecting node 130 and/or the auditor 140, within a time interval. The sending unit 208 further provides the signatures for verifying integrity and/or authenticity of the data sets, e.g., to the collecting node 130. A network interface 210 provides access to the data network 100.

Figure 3:
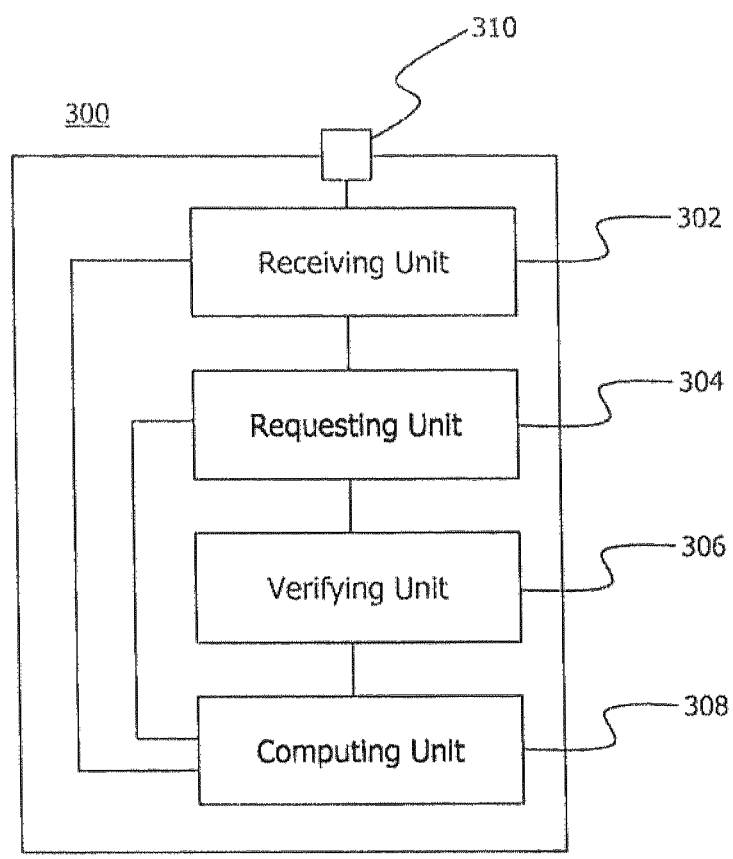
FIG. 3 shows a schematic block diagram of an embodiment of a device for handling data provided from a source node to a collecting node in a data network, which is implementable at the collecting node of FIG. 1.

FIG. 3 shows a schematic block diagram of a device 300 for handling the data provided to the collecting node 130. The device 300 may be implemented at the collecting node 130 in the data network 100.

The device 300 includes a receiving unit 302 for receiving data sets and corresponding signatures, e.g., from the source nodes 120 in the data network. A requesting unit 304 fetches, after a time interval during which the data sets have been sent, values used for computing at least some of the signatures, e.g., from the source node 120 that sent the corresponding data sets. A verifying unit 306 verifies the authenticity of the values. The received data sets, the received signatures corresponding to the data sets and the verified values corresponding to the received signatures are input to a computing unit 308. The computing unit 308 computes reference signatures for verifying integrity of the received data sets. A network interface 310 provides access to the data network 100.

Figure 4:
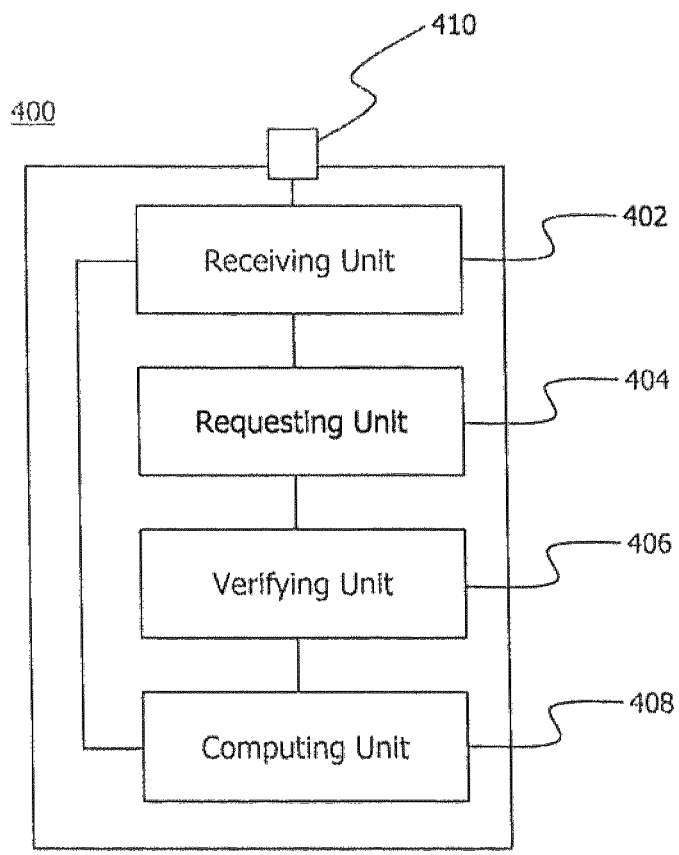
FIG. 4 shows a schematic block diagram of an embodiment of a device for auditing data provided from at least one source node to a collecting node in a data network, which is connectable to the data network of FIG. 1.

FIG. 4 shows a schematic block diagram of a device 400 for auditing the data provided from one or more of the source nodes 120 to the collecting node 130. The device 400 may be implemented at the auditor 140.

The device 400 includes a receiving unit 402 for receiving a root of a Merkle tree that is associated with a time interval during which the data sets were provided. A requesting unit 404 fetches, after the time interval during which the data sets have been provided, values used for computing at least some of the signatures, e.g., from the source node 120 that provided the data sets. A verifying unit 406 verifies the authenticity of the values. Received data sets, the received root value and the verified values are input to a computing unit 408. The computing unit 408 computes reference signatures for the received data sets, and based thereon, a reference root value for auditing the provision of the data sets. The receiving unit 402 optionally receives values of internal vertices of the Merkle tree and/or further signatures necessary for computing the reference root value.

A network interface 410 provides access to the data network 100. A mobile embodiment of the auditor 140 may be configured to collect data sets and signatures directly from various nodes 120 and 130 in the data network 100, e.g., without relying upon data communication in the data network 100.

Figure 5:
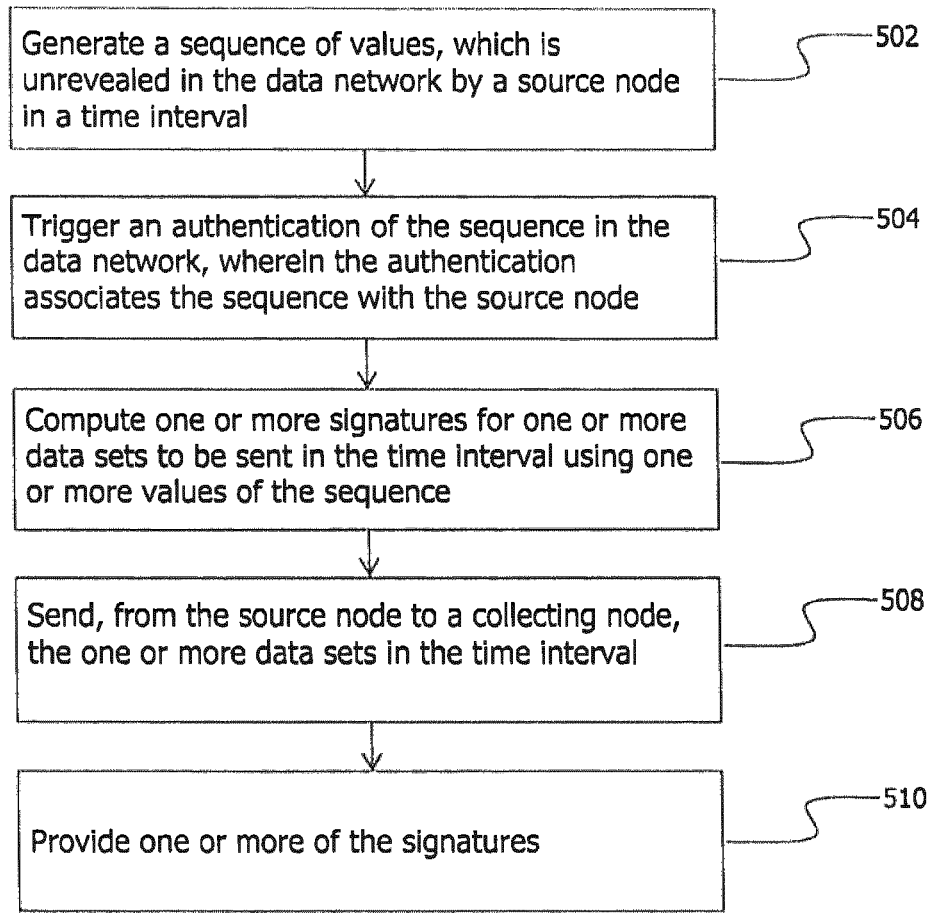
FIG. 5 shows a flowchart of a method of handling data provided from a source node to a collecting node in a data network that is implemented by the device of FIG. 2.

FIG. 5 shows a flowchart of a method 500 for handling data provided by, e.g., the source node 120.

A sequence of values is generated in a step 502. The sequence is associated with a time interval during which data sets are to be sent by the source node 120. The sequence is authenticated in a step 504, so that any other node in the data network 100 is able to verify the authenticity of the sequence. The sequence is, however, not published in the data network 100 until the time interval has expired.

Signatures for the data sets to be sent within the time interval are computed in a step 506. Each signature is a function of both one of the values of the sequence and one of the data sets. The data sets are sent in a step 508, e.g., to the collecting node 130. The signatures are provided in a step 510, e.g., in the same data packet including the data sets or at a later point in time.

The method 500 may be performed by the device 200, e.g., at the source node 120. E.g., the steps 502, 504 and 506 may be performed by the units 202, 204 and 206, respectively, and the steps 508 and 510 may be performed by the unit 208.

Figure 6:
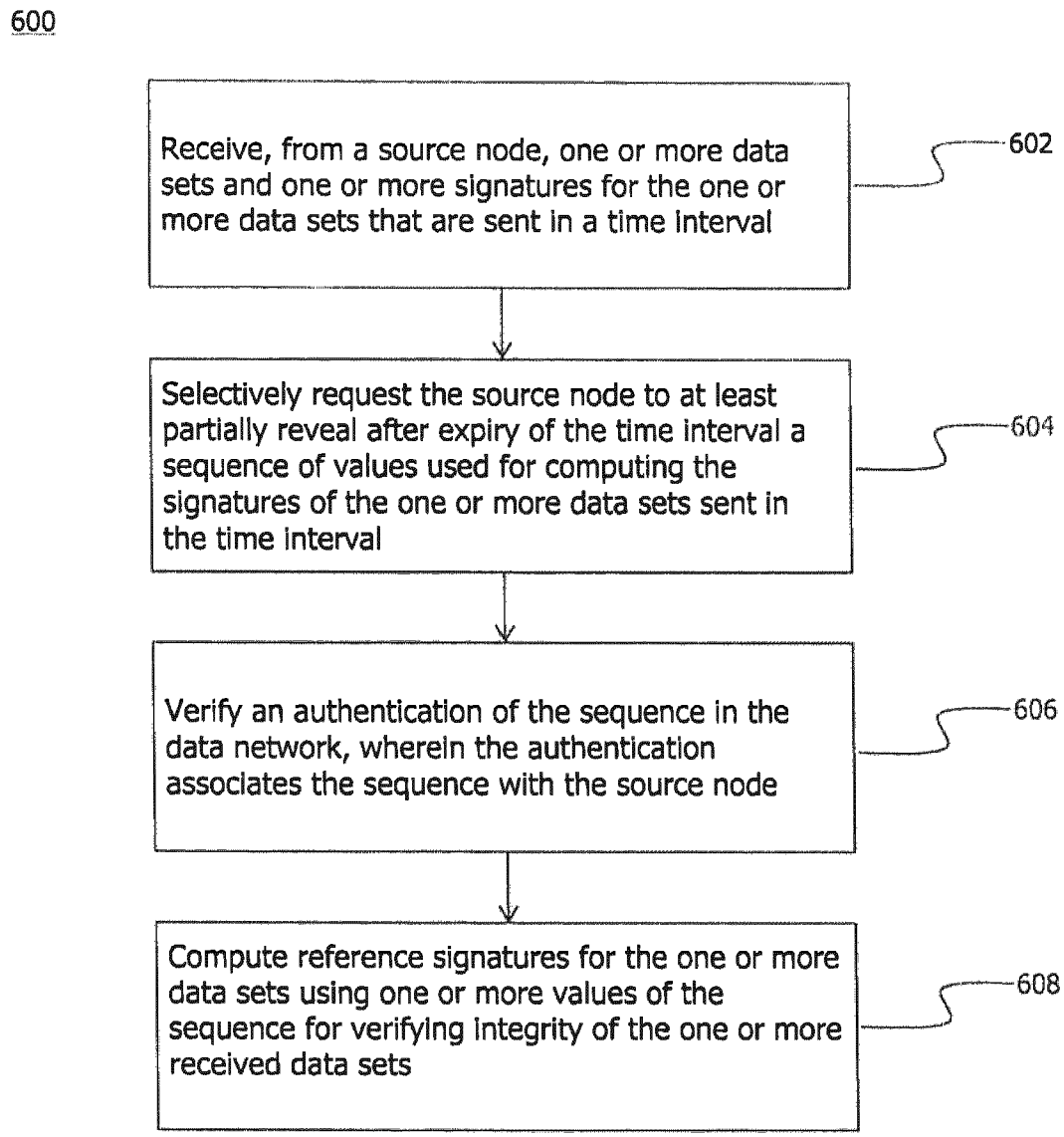
FIG. 6 shows a flowchart of a method of handling data provided from a source node to a collecting node in a data network that is implemented by the device of FIG. 3.

FIG. 6 shows a flowchart of a method 600 for handling data provided, e.g., to the collecting node 130.

In a step 602, data sets are received during a reception time interval, e.g., from the source nodes 120. The reception time interval may differ from a time interval at which the data sets were sent.

The integrity and authenticity of at least some of the received data sets are challenged by requesting from the corresponding source node 120 the sequence values used for computing the signatures in a step 604. The authenticity of the values is verified in a step 606.

In a step 608, a reference signature is computed for each of the challenged data sets using the verified value and the corresponding data set. If the reference sequence coincides with the received sequence, the corresponding data set is marked as authentic. Otherwise, the data set is discarded.

The method 600 may be performed by the device 300, e.g., at the collecting node 130. E.g., the steps 602, 604, 606 and 608 may be performed by the units 302, 304, 306 and 308, respectively.

FIG. 7 shows a flowchart of a method 700 for auditing data provided, e.g., from any one of the source nodes 120 to the collecting node 130 in the data network 100.

A root value of a Merkle tree (e.g., computed at the collecting node 130) is received in a step 702. At least one of the data sets authenticated by the Merkle tree is received in a step 704 for the audit, i.e., to verify that the data set has been received at the collecting node 130 as it was sent by the source node 120 in a time interval associated with the Merkle tree.

In a step 706, the auditor requests the source node to reveal at least the sequence value used for computing the signature of the data set under audit. The authenticity of at least the sequence value is verified in a step 708. A reference signature is computed based on the data set under audit and the verified sequence value in a step 710. Using the reference signature and further signatures and/or sibling values of the Merkle tree, a reference root value is computed in a step 712.

The method 700 may be performed by the device 400, e.g., at the auditor 140. E.g., the steps 702 and 704 are performed by the unit 402, the steps 706 and 708 are performed by the units 404 and 406, respectively, and the step 710 and 712 are performed by the unit 408.

A system embodiment of the technique may combine the methods 500, 600 and/or 700. The system embodiment may use Merkle trees, wherein data to be integrity protected, and possibly audited, enters as part of leaves for the Merkle tree. The hash value, which enters the leaves of the Merkle tree, is key-dependent, wherein the key is a value of the sequence. The key management is simplified using hash chains forming the sequence of values. To allow authentication and auditability, the "end point" of the hash chain is bound to user/entity ID by authenticating the hash chain end-point, e.g., by PKI, GBA or a similar authentication technique.

Auditability in the system embodiment is based on revealing keys, i.e. values of the sequence and to verify them against the associated ID of the source node 120. To avoid that an audit destroys the security, as a consequence of the need to reveal keys, an audit occurring in the middle of the current time interval is postponed until the end of the time interval, when the keys are no longer sensitive. This merely delays audit, but it remains infeasible for the source nodes 120 to "escape responsibility" for having produced a certain data in the time interval. Time intervals can be as fine grained as is practical, e.g., on the order of a millisecond, an hour or differently.

Figure 8:
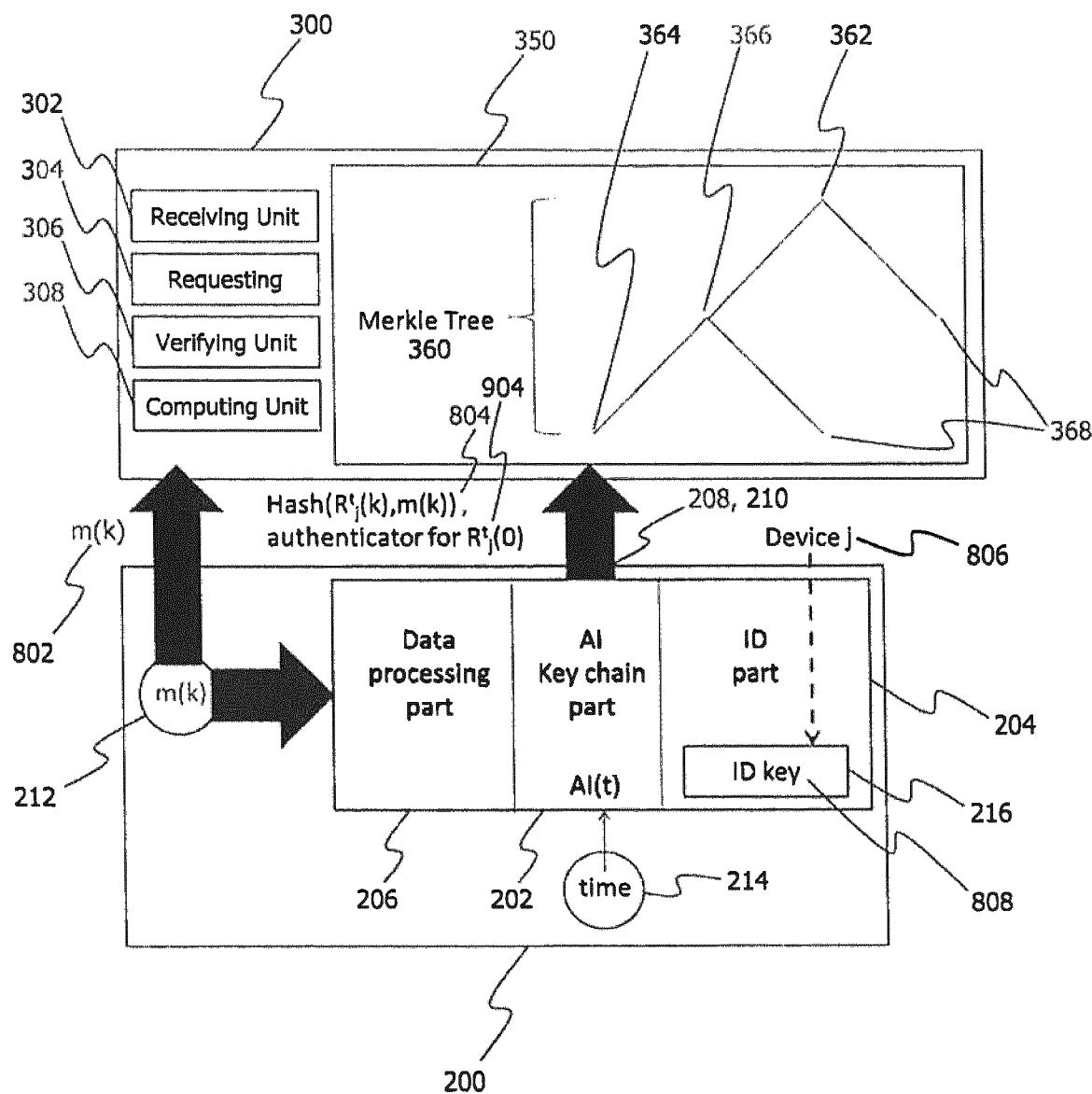
FIG. 8 schematically illustrates an implementation of the devices of FIGS. 2 and 3.

FIG. 8 schematically illustrates the communication 800 between the devices 200 and 300, e.g., the communication between one of the source nodes 120 providing data to the collecting node 130 in the data network 100. The time interval is defined in terms of the time provided by a timer 214 of the device 200. The device 200 further includes a sensor 212 providing the data sets 802.

Digital signatures 804 are referred to as signatures. Conventional signatures address threats associated with man-in-the-middle attacks but are disadvantageous, since conventional signatures are costly to generate in low-end devices such as sensors. Furthermore, conventional signatures require resources for bandwidth and/or storage, e.g., since the signatures have to be stored in preparation for an audit. The technique presented herein reduces the resource requirements by authenticating a sequence of values used within a limited time interval. The number of values used in the sequence is not limited, so that the number of data sets authenticating the sequence. Optionally, the same value can be used for multiple data sets within the time interval.

While the authentication may also use a Public Key Infrastructure (PKI), the costs of conventional signatures are reduced by a factor proportional to the size of the sequence.

The efficiency of Merkle trees can be realized by exchanging only the root value of the Merkle tree in at least some implementations. Furthermore, source authentication is achievable, e.g., to the collecting node 130 as the intended recipient and to the auditor 140 as a third party.

Each leaf 364 of a Merkle tree 360 is associated with one of the data sets generated at a specific source node 120 in the data network 100. Each value of the sequence is used as a key, $R_j(k)$, for computing the signatures, $s_j(k)$, at the leaves of the Merkle tree, e.g., according to $$s_j(k)=H(R_j(k), d_j(k))$$

for the k-th data set, $d_j(k)$, provided by the j-th source node 120.

Moreover, time is divided into a plurality of consecutive time intervals, AI(t) (also referred to as "audit intervals" or "authentication interval") with t=1, 2, etc. If the request 604 or 706 arrives at the source node 120 at time T in the audit interval AI(t), i.e., $$T \in AI(t) \text{ for some } t=1, 2, \text{ etc.},$$

the audit is delayed, e.g., at most until AI(t) has expired. E.g., the audit is performed during the next time interval, AI(t+1), or at the beginning of the next time interval, AI(t+1).

When the audit interval AI(t) starts, or preferable slightly before that, the j-th source node 120 creates the sequence $R_{tj}$ according to the step 502. The end-value of the associated key chain, $R_{tj}(0)$, is made public in an authenticated way according to the step 504. The allowing the authentication according to the step 504 can be implemented in a number of ways.

When the j-th source node 120 is to authenticate the k-th data set, m(k), k≥1, of the current time interval, AI(t), the j-th source node uses $R_{tj}(k)$ as authentication key for the k-th data set. The node that computes the Merkle tree (e.g., the collecting node 130) inserts $$s_{tj}=H(R_{tj}(k),m(k))$$

into the Merkle tree 360 at the corresponding leaf 364. In an exemplary implementation, $R_{tj}(k)$, is thus used only once.

Two implementations are described, that operate differently when the audit request 604 or 706 occurs just after the k-th data set m(k) has been generated.

In both implementations, if the request pertains to a previous time interval, AI(t') for some t'<t (wherein AI(t) is the current time interval), the source node 120 reveals the associated sequence or a generator (also referred to as anchor) of the sequence.

Since the sequence, or indirectly the generator thereof, is authenticated, the sequence or the generator is bound (also referred to as "tied") to j-th source node 120. Using a value of the revealed generator of the sequence, it is possible to compute the sequence, e.g., iteratively forwards until the key, e.g., some value $R_{t'j}(k')$, used for the k'-th data set sent in that previous time interval is retrieved.

From that value, the Merkle tree root of the associated time interval may be verified by any auditor accord to the steps 710 and 712. For example, by determining the path in the Merkle tree from the leaf corresponding to the data set to be verified to the root, and by providing the incoming edge values (also referred to as sub-hashes or sibling values) 368 of the internal vertices 366 on the path.

In the first implementation, if the request 604 or 706 occurs for the current time interval, AI(t), the same procedure, as described for the previous time interval, is performed for the current time interval only after AI(t) expired.

Due to the built-in integrity-preservation of the Merkle tree, this does not imply any chance to tamper data sets. The source node 120 is already "committed" to the value it produced. The first implementation merely implies a delay in the verifiability.

In the second implementation, a "temporary" audit is immediately performed. The j-th source node 120 directly reveal $R_{tj}(k)$. This enables the collecting node 130 and/or the auditor 140 not to verify the exact source device identity, but it enables the collecting node 130 and/or the auditor to verify that all the data sets in the current time interval originate from the same device, i.e., the j-th source node, if a hash-chain sequence is used. Universal observability of the revealing of the key in the data network 100 has to be ensured. The Universal observability avoids that the released key may become available at different times to different auditors 140. The auditor who first receives the key may hypothetically try to corrupt the Merkle tree by using the revealed key to inject another data set. If this occurs before the current Merkle tree root has been made public, the originator of the data set is ambiguous. In order to ensure authenticity of the source node 120, the temporary audit is postponed at least until the root value 362 of the Merkle tree 360 has been re-published.

The technique is combinable with a Public Key Infrastructure (PKI). The PKI is an organization of related certificates with signed public keys. The certificates can be hierarchically organized. The certificates can be vouched for by at least one other certificate except for at most one that is called a root certificate.

If a PKI solution is used, the sequence is authenticated in the step 504 by a hash value (e.g., $R_{tj}(0)$ in the case of a hash-chain) of the sequence. The authenticator of the sequence has to be issue (and computed) only once for each time interval, which reduces the complexity burden of PKI operations, and which makes the technique suitable for use in conjunction with a resource-constraint device as the source node 120.

If Generic Bootstrap Architecture (GBA) is used, the hash value of the sequence can be authenticated by a message authentication code, such as a Message Authentication Code (MAC). More specifically, a Hash MAC (HMAC) is an algorithm that transforms a cryptographic hash value representing the sequence into a message authentication code. The hash algorithm is, e.g., SHA-3 (or any other secure hash algorithm). A key 808 used by the HMAC may be derived by the GBA from the perspective of the collecting node 130 and the auditor 140.

In an exemplary HMAC implementation, an authenticator for the sequence is computed according to $$MAC=HMAC(Kgba, H(Kgba\_org)\|\text{hash of sequence}).$$

In the case of a hash-chain sequence, $R_{tj}(0)$, is the hash 904 of the sequence.

H(Kgba_org) is a hash value of the data that was used to derive Kgba through the GBA protocol and includes an identity 806 related to a Universal Subscriber Identity Module (USIM) 216 and/or the GBA. This allows the collecting node 130 and/or the auditor 140 to contact in the step 606 and 708 a mobile network operator (MNO) that has the USIM key 808 to verify that it was indeed the correct entity, i.e., the source node 120, that computed the MAC value. The computation to derive the MAC authenticator can be done in various ways using the data of sequence hash value (e.g., $R_{tj}(0)$) and the Kgba_org data.

In the case of a PKI implementation, contacting the MNO is replaced by querying a Certificate Revocation List (CRL) update or an Online Certificate Status Protocol (OSCP) check of the certificate in the steps 606 and 708.

The MAC value is a function of the sequence hash value 904, Kgba_org, the key 808 of the USIM and the specific algorithm(s) used to perform the computations. As such the formula given is just an illustration of one possible realization. Any technology other than PKI or GBA may be implemented by adopted for deriving an authenticator for the sequence hash value 904 (e.g., $R_{tj}(0)$ for the hash-chain sequence).

In an alternative embodiment, the component 350 is implemented as a signature-aggregating node. The signature-aggregating node 350 is operated in the data network 100 as a node separate from the source node 120 and/or the collecting node 130.

Figure 9:
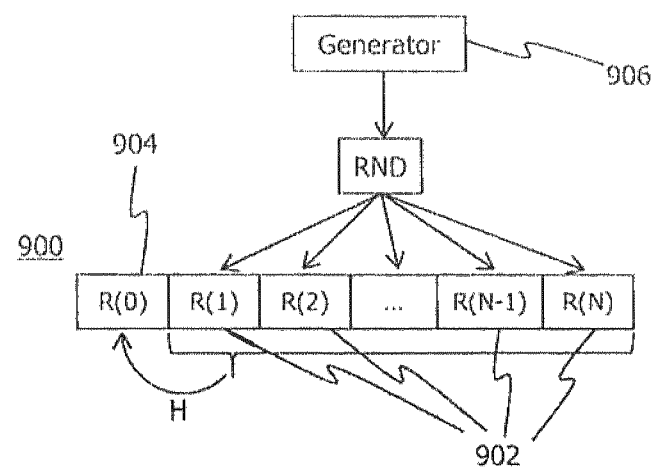
FIG. 9 schematically illustrates a first implementation for generating a sequence of values.

FIG. 9 schematically illustrates a sequence 900 generated in the step 502 based on a generator 906, which is a seed value input to a random number generator RND, resulting in a plurality of values 902. The hash value 904 for authenticating the sequence 900 is computed based on all values 902.

Figure 10:
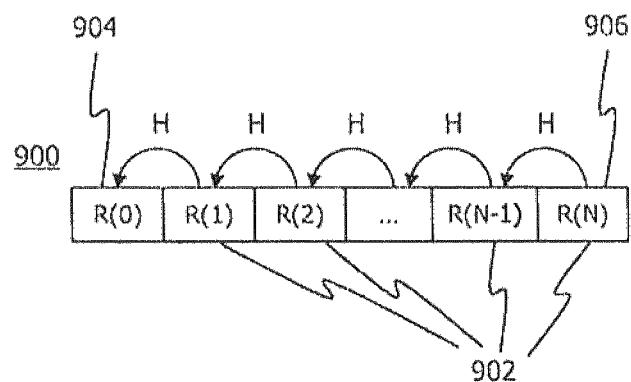
FIG. 10 schematically illustrates a second implementation for generating a sequence of values.

FIG. 10 schematically illustrates an alternative implementation of the step 502 for generating the sequence 900. Hash chains are used to link keys 902 together. The resulting sequence 900 is also denoted hash chain sequence or hash-key chain sequence.

The hash chain sequence 900 is defined by a (e.g., randomly selected) anchor or generator 906, $R(N)$, and $$R(k-1)=H(R(k)), k=N, N-1, \ldots, 1.$$

It is computationally (for anyone and at any node) easy to verify that $R(k)$ is in relation to $R(k-1)$, i.e. that $R(k-1)=H(R(k))$ is fulfilled. But given only $R(k-1)$, it is infeasible to obtain $R(k)$ unless one is in possession of the generator 906, as a result of the properties of the hash function H.

Independent of the implementation of the generation, one sequence 900 is used per source node 120 (indicated by the index j) and per audit interval AI(t) (indicated by the index t).

Specifically, within the time interval AI(t), the j-th source node 120 uses the sequence $$R_{tj}=R_{tj}(N), R_{tj}(N-1), \ldots, R_{tj}(0)$$

In the case of a hash-key chain sequence 900, the values 902 of the sequence are related according to $R_{tj}(k-1)=H(R_{tj}(k))$ for every k, as defined above.

Figure 11:
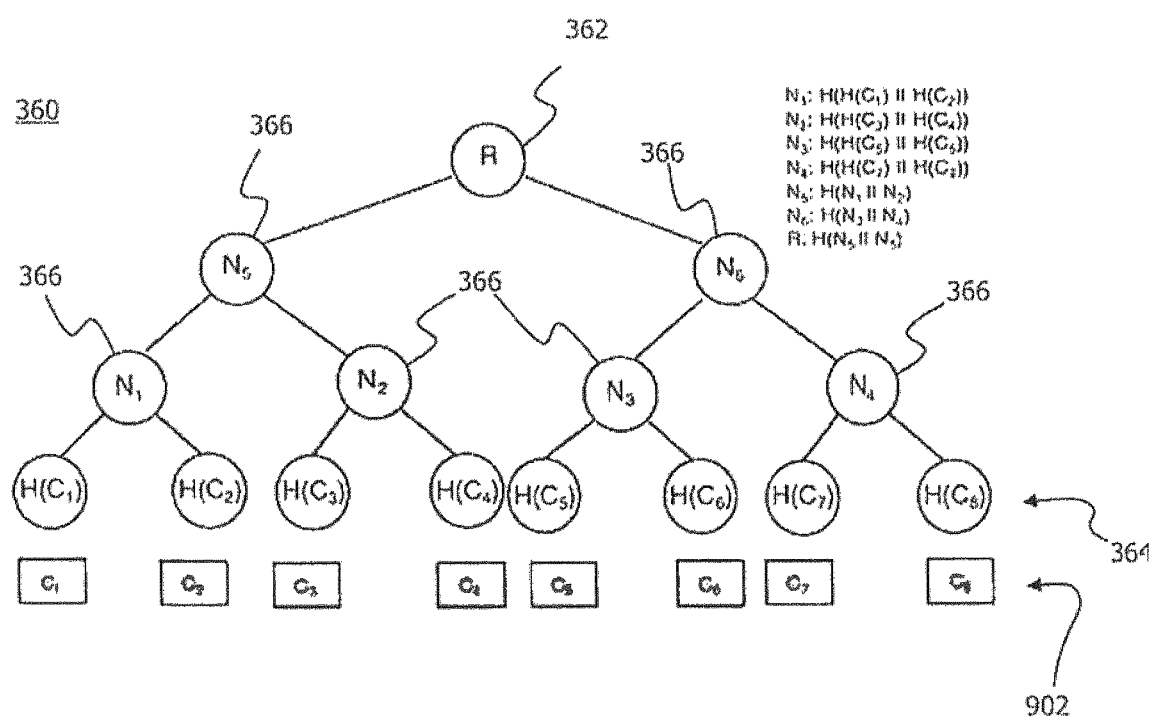
FIG. 11 schematically illustrates a Merkle tree implementable at the source node, the collecting node or the auditor.

FIG. 11 schematically illustrates a Merkle tree 360. In a conventional Merkle tree, the leaves 364 are labeled with hashes of data sets, $C_1$, $C_2$, etc. In the presented technique, the leaves 364 are labeled using additionally the keys represented by the sequence values 902. Internal leaves 366 are labeled by hash values of the two descendants, up to the single root 362.

Examples of data sets, $C_j(k)$, include the age and a zip code provided by one of the source nodes 120.

Keys, $R_{jt}$, may be shared with other nodes 120 to 140 in the data network 100, not only in the same domain, but also for audits, after expiry of the time interval AI(t). For example, the signature $s_j$ is computed in the steps 506, 608 and 710 according to $$s_{tj}(k)=H(R_{tj}(k),C_{tj}(k)),$$

wherein $R_{tj}(k)$ is the k-th value 902 of the sequence 900 associated with the sensor j. The data set $C_{tj}(k)$ is any data item generated by the sensor 212.

The technique allows a plurality of data items to be authenticated, and does ensure data integrity in case of an audit. If a third party 140 wishes to audit "who generated what data", it becomes necessary to reveal the key $R_{tj}(k)$ used at the source node 120. From this point on the key is "leaked" but data security and auditability ensured due to the expiry of the time interval. For example, a second auditor 140, which does not trust the first auditor, the second auditor can independently perform a further audit, e.g., based on a published root value 362 of the Merkle tree 360. The first auditor cannot use the revealed key outside the time interval.

Figure 12:
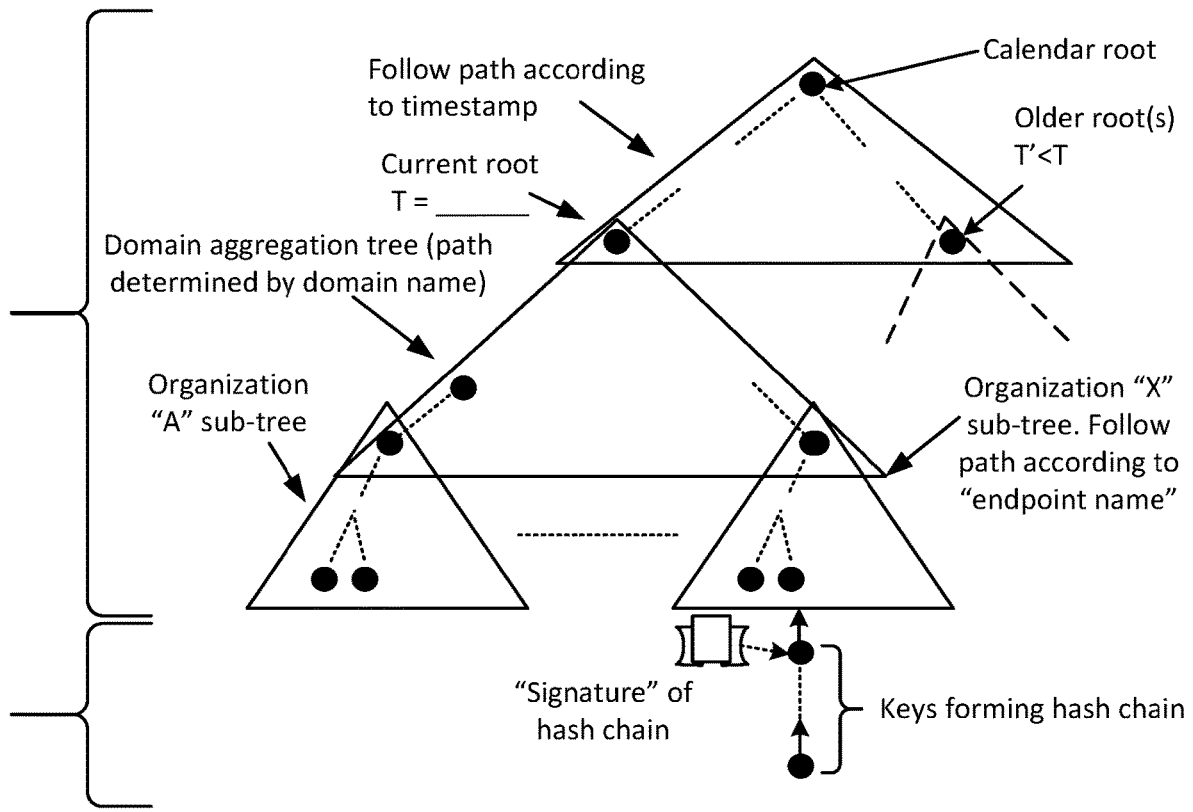
FIG. 12 schematically illustrates a hierarchy of Merkle trees for the data network.

FIG. 12 shows a hash-structure for implementing the technique in conjunction with a hierarchy of Merkle trees that aggregates the signatures over domains of nodes 120, 130 and/or over a plurality of time intervals.

The technique is combinable with guard time, i.e., name space and time are synchronization. The timing aspects of guard time can be integrated with the present technique.

Regarding the name space, locally within a Merkle tree 360, a leaf 364 can be assigned a name according to its position relative to the root, by starting from the root and following a path down to the associated leaf 364. Such a path consists of a number of "left" or "right" branches. For each "left" branch, a bit "0" is assigned to the name and for each "right" branch a bit "1" is assigned. Hence, a binary number is obtained as the name. The number of bits in the binary number equals the depth of the Merkle tree 360. For example, $C_4$ of FIG. 11 is associated with "011" (left-right-right), which can serve as the name or identifier for $C_4$, relative to the root 362.

FIG. 12 schematically illustrates connected Merkle trees. To get a "global" name space, the end-point name is concatenated with a "name" for the root 362, as seen from the perspective of a higher-ranked Merkle tree. There is one Merkle tree per "domain" (e.g., per company, or per operator, etc.). These Merkle trees are arranged as sub-trees of a higher-ranked Merkle tree and in the same way, a "name" for each root of the Merkle sub-trees is obtained by starting from a global "super-root". In this way, each node/entity in the data network 100 (and beyond) can be assigned a unique name. To authenticate the hash-chain values 902, as required by the technique in the steps 504, a public key certificates may be used in which the "issuer" and/or "subject" name is populated by the corresponding name(s).

Regarding timing issues, a global root at certain time intervals, T, is updated. Each time interval T corresponds to one published hash root (HRT). This root value may be referred to as "hash calendar", as indicated in FIG. 12. All the Merkle trees corresponding to different domains (as described above) are arranged under this calendar root. To maintain backwards history intact, old calendars are "hashed into" the present one, each time an update occurs every T time units (e.g., T=1 sec). To this end, the current time stamp (e.g., the number of seconds since 1970-01-01) to decides the "tree topology". For example, if the binary representation of the current time is "0110", the current root is placed relative to the calendar root by following a left-right-right-left path. The next publication, which will occur at time "0111", will be placed as the left-right-right-left subtree of the calendar root, and so on.

In one implementation of the technique combinable with guard time, the audit intervals coincide with the intervals of publication of the calendar values. Alternatively, a more fine-grained time resolution is used, wherein verifiability is local to a specific domain (e.g., organization according to the Merkle sub-trees).

As has become apparent from above description, at least some embodiments of the technique allow using each value in the sequence as a key for signing one of the data sets. The technique allows revealing a plurality of keys, e.g., since the sequence may have any length. The revealing can be efficiently implemented by providing only the generator of the sequence as a single value. Furthermore, the technique avoids that the keys enter the leaves of a Merkle tree.

At least some embodiments of the technique thus avoid that, every time a key is used, one leaf of the Merkle tree is consumed. The technique does not require knowing in advance how many messages will be generated in order to allocate a sufficiently large Merkle tree.

The technique avoids or limits the problems that signature schemes have and gives the benefits from using Merkle trees also in a setup that includes a third party auditor for verifying the integrity of the data, which is not possible with a state-of-the-art use of Merkle trees.

Specifically the use of PKI can be reduced or avoided, and the amount of data that has to be stored is reduced. If a PKI is to be used, for example for legacy installation of the a network provider, the use of PKI can be limited to the end points, thus relaxing performance bottlenecks.

Furthermore, the binding to an ID of a source node can be realized in other ways without using a PKI. One example is a Generic Bootstrap Architecture, as a technique standardized in 3GPP and which uses USIM as key storage tokens. The technique is thus implementable with reduced computational requirements to derive an application key from a primary key stored in an UICC token that implements the USIM application.

Furthermore, GBA is particularly useful, since it has per design the capability to renew (i.e., derived) keys. Besides PKI and GBA, other schemes can be used to compute an authenticator for the sequence hash value, such as OpenID and ISIM.

The technique is not limited by above description of exemplary embodiments but defined by the enclosed claims.

The invention claimed is:

1. A method of communicating data from a source node to a collecting node in a data network, the method comprising the following steps performed by the source node:
generating a sequence of values by iteratively applying a cryptographic hash function, H, to a generator, R(N), according to $R(k-1)=H(R(k))$ for $k=N, \ldots, 1$;

keeping the sequence of values unrevealed outside of the source node throughout a time interval;
providing an authenticator of the sequence of values that associates the sequence of values with the source node to prove to a recipient of the sequence of values that the source node is an actual originator of the sequence of values, wherein the authenticator includes a hash value computed based on both a hash value of the sequence and a key of the source node, wherein the hash value of the sequence is an end result, R(0), produced by generating the sequence of values;
computing one or more signatures for one or more data sets to be sent during the time interval using one or more values of the sequence of values, wherein each of the one or more signatures is a function of both one of the values of the sequence of values and one of the data sets;
sending, from the source node to the collecting node, the one or more data sets during the time interval;
providing one or more of the signatures by which integrity of the one or more data sets sent in the time interval is made verifiable; and
supplying the authenticator for use by one or more of the collecting node and an auditing node after expiration of the time interval.

2. The method of claim 1, further comprising:
at least partially revealing the sequence of values after expiry of the time interval.

3. The method of claim 2, wherein the sequence of values is at least partially revealed upon request.

4. The method of claim 2, wherein the revealing includes sending at least one of the one or more values of the sequence of values, the sequence of values and a generator of the sequence.

5. The method of claim 1, wherein the time interval is defined by a clock of the source node.

6. The method of claim 1, wherein the one or more data sets are stored at the source node until after the expiry of the time interval.

7. The method of claim 1, wherein the one or more signatures are provided from the source node to the collecting node.

8. The method of claim 1, wherein a signature, s(k), is computed for each of the one or more data sets, m(k), to be sent according to $s(k)=H(R(k), m(k))$, wherein H is a hash function and R(k) is one of the values of the sequence of values.

9. The method of claim 1, wherein the authenticator is provided before at least one of sending the one or more data sets and providing the one or more signatures.

10. The method of claim 1, wherein the authentication binds a hash value of the sequence of values to an identifier of the source node.

11. The method of claim 10, wherein the authentication binds the hash value through a message authentication code computed using a key associated with the identifier of the source node.

12. The method of claim 11, wherein the authenticator is computed in a key storage token including storage that holds the key associated with the identifier of the source node.

13. The method of claim 10, wherein the authentication of the sequence of values is triggered by registering the hash value of the sequence of values at an authenticating node providing access to the authenticator in the data network.

14. The method of claim 13, wherein registering includes sending the hash value of the sequence of values to the authenticating node via a secure channel that secures that the hash value of the sequence of values is sent from the source node.

15. The method of claim 13, wherein the registration includes signing of the hash value of the sequence of values using a key associated with the identifier of the source node.

16. The method of claim 10, wherein the authentication binds the hash value of the sequence of values through a digital signature computed using a secret key related to a public key, wherein the public key is associated with the identifier of the source node.

17. The method of claim 1, wherein each value in the sequence of values is used at most once for computing the one or more signatures.

18. The method of claim 1, wherein the values of the sequence of values are sequentially used for computing the signature of each of the data sets using each value of the sequence of values for at most one data set.

19. The method of claim 1, wherein time is divided into a plurality of time intervals and the method is performed for each of the time intervals.

20. A method of communicating data from a source node to a collecting node in a data network, the method comprising the following steps performed by the collecting node:

receiving, from the source node, one or more data sets and one or more signatures for the one or more data sets that are sent in a time interval;

selectively requesting the source node to at least partially reveal after expiry of the time interval a sequence of values used for computing the signatures of the one or more data sets sent in the time interval, wherein the sequence of values comprises values generated by iteratively applying a cryptographic hash function, H, to a generator, R(N), according to $$R(k-1)=H(R(k)) \text{ for } k=N, \ldots, 1;$$

using an authenticator to verify an authentication of the sequence of values in the data network, wherein the authentication associates the sequence of values with the source node and proves that the source node is an actual originator of the sequence of values, wherein the authenticator includes a hash value computed based on both a hash value of the sequence and a key of the source node, wherein the hash value of the sequence is an end result, R(0), produced by generating the sequence of values; and computing reference signatures for the one or more data sets using one or more values of the sequence of values for verifying integrity of the one or more received data sets.

21. The method of claim 20, further comprising:

computing a Merkle tree, wherein leaves of the Merkle tree represent the received signatures.

22. The method of claim 21, wherein data sets and signatures for the data sets are received from one or more source nodes in the data network, and wherein each of the signatures received from each of the one or more source nodes is input to a different one of the leaves of the Merkle tree.

23. The method of claim 22, further comprising:

sending, to at least one of the source nodes, values of siblings along a path in the Merkle tree between root and at least one leaf corresponding to the at least one of the source nodes.

24. The method of claim 21, further comprising at least one of:

storing a value of the root of the Merkle tree; and storing values of internal vertices and/or leaves of the Merkle tree.

25. A method of auditing data communicated from at least one source node to a collecting node in a data network, wherein the method is performed by an auditing node and comprises:

receiving, from the collecting node, a value of a root of a Merkle tree that is associated with a time interval and computed based on a plurality of signatures provided by the at least one source node for a plurality of data sets that were sent in the time interval to the collecting node;

receiving, from at least one of the source nodes or the collecting node, at least one of the data sets;

requesting the at least one source node to at least partially reveal after expiry of the time interval a sequence of values used for computing at least one signature for the received at least one of the data sets, wherein the sequence of values comprises values generated by iteratively applying a cryptographic hash function, H, to a generator, R(N), according to $$R(k-1)=H(R(k)) \text{ for } k=N, \ldots, 1;$$

using an authenticator to verify an authentication of the sequence of values in the data network, wherein the authentication associates the sequence of values with the source node and proves that the source node is an actual originator of the sequence of values, wherein the authenticator includes a hash value computed based on both a hash value of the sequence and a key of the source node, wherein the hash value of the sequence is an end result, R(0), produced by generating the sequence of values;

computing at least one reference signature for the received at least one data set using at least one of the values of the sequence of values; and computing a reference root value for auditing the data provision, wherein computation of the reference root value is based on the at least one reference signature.

26. The method of claim 25, further comprising:

receiving, from the at least one source node or the collecting node, values of siblings along a path in the Merkle tree between root and at least one leaf corresponding to the at least one reference signature for the received at least one data set, wherein the computation of the reference root value is further based on the received values of the siblings.

27. The method of claim 25, further comprising:

receiving signatures, for which no reference signature is computed, from the at least one source node or the collecting node, wherein the computation of the reference root value is further based on the received signatures.

28. A nontransitory computer readable storage medium comprising a computer program product comprising instructions for performing, when executed by one or more computing devices, a method of communicating data from a source node to a collecting node in a data network, the method comprising the following steps performed by the source node:

generating a sequence of values by iteratively applying a cryptographic hash function, H, to a generator, R(N), according to $$R(k-1)=H(R(k)) \text{ for } k=N, \ldots, 1;$$

keeping the sequence of values unrevealed outside of the source node throughout a time interval;

providing an authenticator of the sequence of values that associates the sequence of values with the source node to prove to a recipient of the sequence of values that the source node is an actual originator of the sequence of values, wherein the authenticator includes a hash value computed based on both a hash value of the sequence and a key of the source node, wherein the hash value of the sequence is an end result, R(0), produced by generating the sequence of values;

computing one or more signatures for one or more data sets to be sent during the time interval using one or more values of the sequence of values, wherein each of the one or more signatures is a function of both one of the values of the sequence of values and one of the data sets;

sending, from the source node to the collecting node, the one or more data sets during the time interval;

providing one or more of the signatures by which integrity of the one or more data sets sent in the time interval is made verifiable; and supplying the authenticator for use by one or more of the collecting node and an auditing node after expiration of the time interval.

29. A device for communicating data provided from a source node to a collecting node in a data network, the device comprising:

a generating unit adapted to generate a sequence of values by iteratively applying a cryptographic hash function, H, to a generator, R(N), according to $$R(k-1)=H(R(k)) \text{ for } k=N, \ldots, 1;$$

keeping the sequence of values unrevealed outside of the source node throughout a time interval;

an authenticating unit adapted to providing an authenticator of the sequence of values that associates the sequence of values with the source node to prove to a recipient of the sequence of values that the source node is an actual originator of the sequence of values, wherein the authenticator includes a hash value computed based on both a hash value of the sequence and a key of the source node, wherein the hash value of the sequence is an end result, R(0), produced by generating the sequence of values;

a computing unit adapted to compute one or more signatures for one or more data sets to be sent during the time interval using one or more values of the sequence of values, wherein each of the one or more signatures is a function of both one of the values of the sequence of values and one of the data sets; and a sending unit adapted to send, from the source node to the collecting node, the one or more data sets during the time interval, and to provide one or more of the signatures by which integrity of the one or more data sets sent in the time interval is made verifiable, and to supply the authenticator for use by one or more of the collecting node and an auditing node after expiration of the time interval, wherein the generating, authenticating, computing, and sending units are implemented as software executed by one or more of:

a programmed microprocessor;
an Application Specific Integrated Circuit;
a Field Programmable Gate Array;
a Digital Signal Processor;
a general purpose computer device; and
an Advanced Reduced Instruction Set Computer Machine.

30. A collecting node device for processing data received from a source node in a data network, the collecting node device comprising:

a receiving unit adapted to receive, from the source node, one or more data sets and one or more signatures for the one or more data sets that are sent in a time interval;

a requesting unit adapted to selectively request the source node to at least partially reveal after expiry of the time interval a sequence of values used for computing the signatures of the one or more data sets sent in the time interval, wherein the sequence of values comprises values generated by iteratively applying a cryptographic hash function, H, to a generator, R(N), according to $$R(k-1)=H(R(k)) \text{ for } k=N, \ldots, 1;$$

a verifying unit adapted to use an authenticator to verify an authentication of the sequence of values in the data network, wherein the authentication associates the sequence of values with the source node and proves that the source node is an actual originator of the sequence of values, wherein the authenticator includes a hash value computed based on both a hash value of the sequence and a key of the source node, wherein the hash value of the sequence is an end result, R(0), produced by generating the sequence of values; and a computing unit adapted to compute reference signatures for the one or more data sets using one or more values of the sequence of values for verifying integrity of the one or more received data sets wherein the receiving, requesting, verifying, and computing units are implemented as software executed by one or more of:

a programmed microprocessor;
an Application Specific Integrated Circuit;
a Field Programmable Gate Array;
a Digital Signal Processor;
a general purpose computer device; and
an Advanced Reduced Instruction Set Computer Machine.

31. A device for auditing data communicated from at least one source node to a collecting node in a data network, the device comprising:

a receiving unit adapted to receive, from the collecting node, a value of a root of a Merkle tree that is associated with a time interval and computed based on a plurality of signatures provided by the at least one source node for a plurality of data sets that were sent in the time interval to the collecting node, and to receive, from at least one of the source nodes or the collecting node, at least one of the data sets;

a requesting unit adapted to request the at least one source node to at least partially reveal after expiry of the time interval a sequence of values used for computing at least one signature for the received at least one of the data sets, wherein the sequence of values comprises values generated by iteratively applying a cryptographic hash function, H, to a generator, R(N), according to $$R(k-1)=H(R(k)) \text{ for } k=N, \ldots, 1;$$

a verifying unit adapted to use an authenticator to verify an authentication of the sequence of values in the data network, wherein the authentication associates the sequence of values with the source node and proves that the source node is an actual originator of the sequence of values, wherein the authenticator includes a hash value computed based on both a hash value of the sequence and a key of the source node, wherein the hash value of the sequence is an end result, R(0), produced by generating the sequence of values; and a computing unit adapted to compute at least one reference signature for the received at least one data set using at least one of the values of the sequence of values, and to compute a reference root value for auditing the data provision, wherein computation of the reference root value is based on the at least one reference signature, and wherein the receiving, requesting, verifying, and computing units are implemented as software executed by one or more of:

a programmed microprocessor;
an Application Specific Integrated Circuit;
a Field Programmable Gate Array;

a Digital Signal Processor;
a general purpose computer device; and
an Advanced Reduced Instruction Set Computer Machine.

\* \* \* \* \*